United States Patent
Walker

(10) Patent No.: US 7,497,886 B2
(45) Date of Patent: Mar. 3, 2009

(54) DUST EXTRACTION FOR POWER TOOLS

(75) Inventor: Andrew Walker, Newton Hall (GB)

(73) Assignee: Black & Decker Inc., Newark, DE (US)

( * ) Notice: Subject to any disclaimer, the term of this patent is extended or adjusted under 35 U.S.C. 154(b) by 405 days.

(21) Appl. No.: 11/269,986

(22) Filed: Nov. 9, 2005

(65) Prior Publication Data

US 2006/0107633 A1    May 25, 2006

(30) Foreign Application Priority Data

Nov. 19, 2004   (EP)   ................... 04027589

(51) Int. Cl.
*B24B 23/00* (2006.01)
*B24B 23/04* (2006.01)

(52) U.S. Cl. .......... 55/385.1; 55/498; 55/302; 173/71; 173/73; 451/87; 451/88; 451/270; 451/354; 451/357; 451/451; 451/453; 451/456

(58) Field of Classification Search ........... 55/385.1, 55/498, 302; 173/71, 73; 451/87, 88, 270, 451/354, 357, 451, 453, 456
See application file for complete search history.

(56) References Cited

U.S. PATENT DOCUMENTS

| | | | |
|---|---|---|---|
| 5,941,765 A * | 8/1999 | Taylor | 451/359 |
| 6,224,471 B1 * | 5/2001 | Clowers et al. | 451/359 |
| 6,506,107 B2 * | 1/2003 | Clowers et al. | 451/359 |
| 6,641,634 B2 * | 11/2003 | Reich et al. | 55/385.1 |
| 6,746,500 B1 | 6/2004 | Park et al. | |
| 7,118,609 B2 * | 10/2006 | Valentini | 55/385.1 |
| 2004/0103495 A1 | 6/2004 | Oh | |

FOREIGN PATENT DOCUMENTS

DE    198 27 173 A1   12/1999

OTHER PUBLICATIONS

European Search Report.
Annex to the European Search Report.

* cited by examiner

*Primary Examiner*—Duane S Smith
*Assistant Examiner*—Minh-Chau T Pham
(74) *Attorney, Agent, or Firm*—Wesley W. Muller

(57) ABSTRACT

There is also provided a dust extraction module for use with a power tool, the dust extraction module having: a dust collection chamber (50) having an inlet (52) connectable in fluid communication with an outlet (44) of a dust-extracting duct (40) of the power tool, and having an outlet (54) in fluid communication with atmospheric air; and a filter (60) locatable in fluid flow between the outlet of the dust collection chamber and the atmospheric air; wherein the dust collection chamber (50) has a substantially circular cross section, the inlet (52) to the dust collection chamber is at the perimeter of the circle and the outlet (54) of the dust collection chamber is from the middle of the circle.

45 Claims, 16 Drawing Sheets

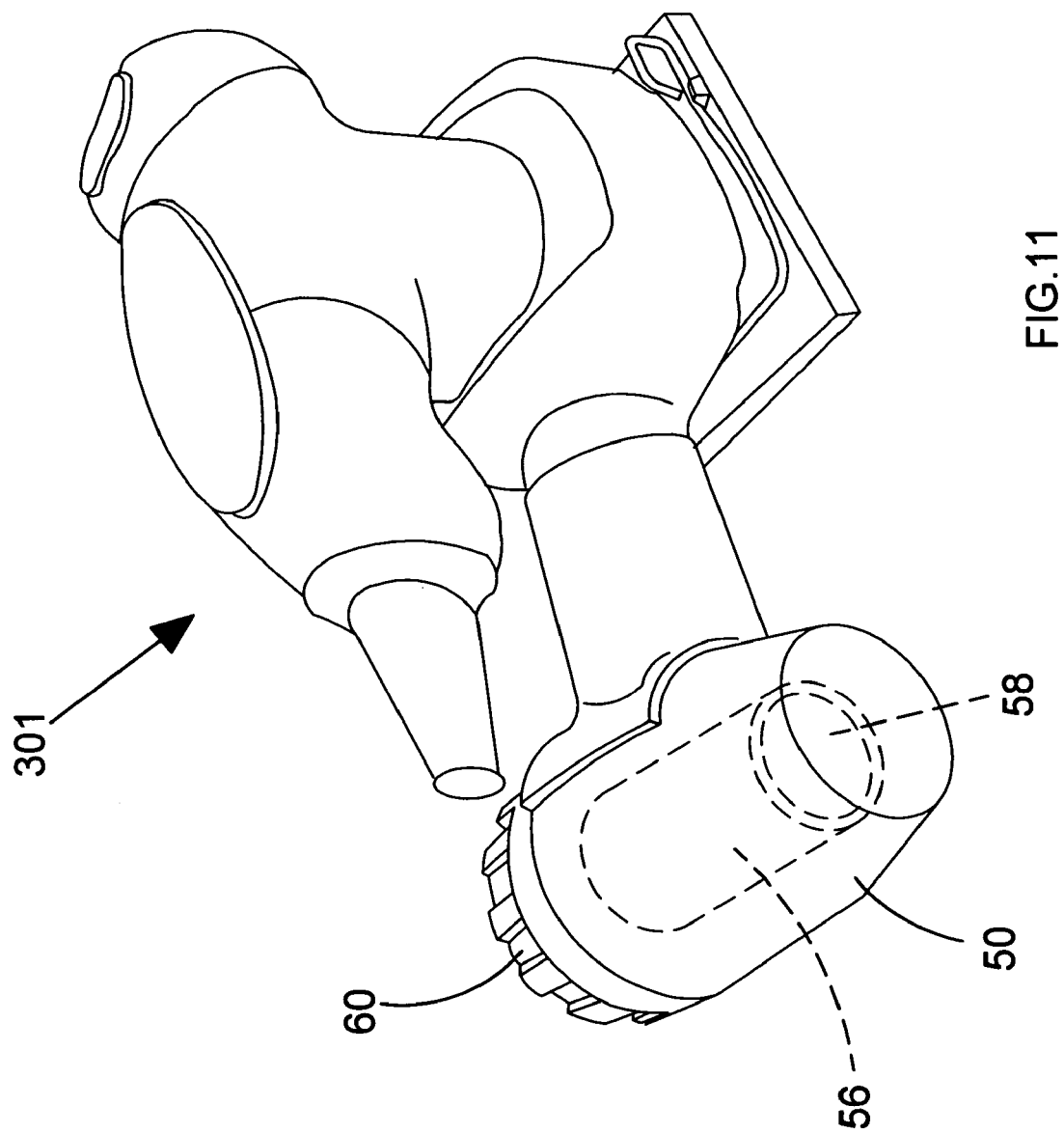

DUST EXTRACTION FOR POWER TOOLS

FIELD OF THE INVENTION

The present invention relates to dust extraction for power tools. More particularly, dust extraction for power tools of the hand-holdable variety, such as sanders, drills, routers, saws, hammers, grinders and other power tools generating sawdust when applied to a work piece.

BACKGROUND OF THE INVENTION

The dust generated by the use of power tools is of a fine particulate nature and floats easily in the surrounding air under normal operating conditions. Vibrations associated with the operation of the power tools also tend to disperse this dust still further. A working environment containing suspended dust is unpleasant, inconvenient and unhealthy for users of these tools. Moreover, once the dust has settled, a user is required to clean-up and remove the scattered dust from the environment. In view of these problems, a number of prior art arrangements have already been developed for extracting dust from around the operating region of power tools.

Early ideas for dust extraction systems are discussed in two sections headed "Dust Extraction Systems" and "Dust Separation Units" on pages 104-116 of the book "Ergonomic Tools in our Time", an Atlas-Copco publication, by Bo Lindqvist et al., 1986 (ISBN: 91 7810 535 8). FIG. 1 illustrates the dust extraction broken down into a chain of general components. A dust extraction hood 200, located close to the point where the dust is generated 100, is operably connected to a suction hose 300. The suction hose 300 is in turn connected to suitable pipework 500 in fluid communication with the suction hose 300 with some separation means 600 for separating the dust from air taken in by via a vacuum source 700 that generates a flow of air through the dust extraction system. A swing arm 400 supports the suction hose 300. There are several examples of means for separating the dust from air taken in by the dust extraction system, including cyclones and filters. Examples of the vacuum source for generating a flow of air through the dust extraction system include fans and root pumps. However, it can be seen in this book that although the power tools discussed are hand-held tools, the dust extraction system which is intended for use in association with them is a much larger, facilitating a more permanent mounted system.

Examples of more recent ideas for dust extraction techniques for use with hand-holdable power tools which are highly portable concentrate on the idea of using the same motor which provides power to the tool for its main function as also being used as the source of power for generating a flow of air through the dust extraction system. Contrary to the system shown in FIG. 1, this arrangement allows a considerable saving on space and weight. Since the motor which provides power to the tool's main function also acts as the source of power for generating a flow of air through the dust extraction system, there is no need to locate the means for separating the dust from air taken in by the dust extraction system at a distance which is remote from the region where the dust is generated, namely the point of contact between a working element (e.g., a drill bit, saw blade, sheet of sandpaper) which is held by a working head of the power tool and a workpiece, such as a piece of wood. Consequently, there is also no need for a suction hose or other pipework to connect the region where dust is generated with the means for separating the dust from air taken in by the dust extraction system. Instead, a short duct built into the power tool itself will generally suffice. Accordingly, these dust extraction systems generally comprise; a duct having an inlet located proximate the point of contact between the working element held by the power tool and a workpiece; a dust collection chamber having an inlet in fluid communication with an outlet from the duct; an outlet of the dust collection chamber in fluid communication with atmospheric air; a fan operable to transport air from the inlet of the duct to the outlet thereof; and, a filter situated between the outlet of the dust collection chamber and atmospheric air.

An example of such a dust extraction system is described in U.S. Pat. No. 6,514,131. This patent shows a sander having a sanding plate for holding a sheet of sandpaper, a fan for transporting air from the point of contact between the sandpaper and a workpiece through a duct to an outlet thereof, which exhausts into a dust collection chamber. The dust collection chamber is a rigid, self-supporting box having a cover with a plurality of openings in fluid communication with atmospheric air. A filter element that extracts dust from the air passing is positioned between openings and the atmospheric air is a filter element which extracts dust from the air passing to atmosphere, causing it to be held in the dust collection chamber.

A second example of such a dust extraction system is described in U.S. Pat. No. 6,224,471. This patent also shows a sander, which has a platten for holding a sheet of sandpaper, a fan with blades for transporting air from the point of contact between the sandpaper and a workpiece through a duct into a dust collection chamber. In this case, the dust collection chamber is formed from a porous plastic material, so that the interior of the dust collection chamber is in fluid communication with atmospheric air and the body of the chamber itself acts as a filter for extracting dust which is collected therein. A membrane formed across the inlet to the dust collection chamber acts as a trapdoor to prevent dust returning down duct under the action of gravity when the fan is switched off. In U.S. Pat. No. 6,224,471, the dust collection chamber is substantially cylindrical in shape and therefore has a substantially circular cross-section, and the inlet thereto is located on one of the end faces of the cylinder, with the curved surface of the cylinder and the other end face thereof acting as the outlet. Moreover, U.S. Pat. No. 6,224,471 teaches that the dust collection chamber is substantially cylindrical in shape and therefore has a substantially circular cross-section, the inlet thereto is located on one of the end faces of the cylinder, with the curved surface of the cylinder and the other end face thereof acting as the outlet.

A further example is described in U.S. Pat. No. 4,967,516. This patent also describes a sander having a platten for holding a sheet of sandpaper, a fan for transporting air from the point of contact between the sandpaper and a workpiece through a duct having an outlet which exhausts into a dust collection chamber. In this case, the dust collection chamber is a semi-rigid frame having a plurality of windows formed therein in fluid communication with atmospheric air. Each of the windows is covered by a mesh fabric which extracts dust from the air passing to atmosphere, causing it to be held in the dust collection chamber.

A final example of a known dust extraction system for use which a power tool is shown in FIG. 2. Here, a drill 10, having a working head (chuck) 12 for holding a drill bit, is provided with a dust collection chamber 14, which is connected via a duct 16 with a fan housed in drill 12. The duct 16 is provided with an inlet 18 locatable in proximity to a point of contact between the drill held by chuck 12 and a workpiece. The dust collection chamber 14 contains a fabric bag 20 as shown in FIG. 3. The fabric bag 20 comprises a plastic frame 22, which includes a centrally located tube 24 open at both ends and having a mouth 26, as shown in FIG. 4, where the frame 22 has been removed from bag 20 to show its construction. The inlet 18 to duct 16 is so arranged that during operation of the fan, dust-laden air passes through the mouth 26 of tube 24 in the direction indicated by arrow A in FIG. 4 into the interior of bag 20 in the direction indicated by arrow B in FIG. 4 where the dust is collected. Filtered air then passes outwards through the bag 20 into dust collection chamber 14 and thence down duct 16 to the fan housed in drill 12, where it is exhausted to atmosphere through the vents 28 shown in FIG. 2. Thus, this prior art dust extraction system is distinguished from those disclosed in U.S. Pat. Nos. 6,514,131, 6,224,471 and 4,967,516 in that it uses a "clean fan", rather than "dirty fan" dust extraction technique. In other words, in this system, the air transported by the fan is filtered before it makes contact with the fan, rather than after. In this respect, the dust extraction system described with reference to FIGS. 2 to 4 is analogous in both the layout of its components and its mode of operation to a conventional domestic vacuum cleaner.

However, all of the prior art dust collection systems shown in U.S. Pat. Nos. 6,514,131, 6,224,471 and 4,967,516 and in FIGS. 2 to 4 below suffer from the disadvantage that the filters used therein easily become blocked with dust, thereby rapidly diminishing the performance of these dust extraction systems. Moreover, unlike the dust extraction system discussed above in relation to FIG. 1, since the motor which powers the fan for transporting air through these dust extraction systems also provides motive power to the working head of the power tool, if the filters therein do become clogged with dust, the operation of the fan cannot be increased by a similar amount to compensate.

Accordingly, the present invention seeks to provide a solution to this and other technical problems with the types of dust extraction systems described in U.S. Pat. Nos. 6,514,131, 6,224,471 and 4,967,516 and in relation to FIGS. 2 to 4 below, without engendering the problems with the alternative dust extraction system described above in relation to FIG. 1.

SUMMARY OF THE INVENTION

In a first aspect, therefore, the present invention provides a power tool comprising: a working head for holding a working element; a duct having an inlet locatable in proximity to a point of contact between the working element and a workpiece; a dust collection chamber having an inlet in fluid communication with an outlet from the duct, and an outlet in fluid communication with atmospheric air; a fan operable to transport air from the inlet of the duct to the outlet thereof; and a filter located in fluid flow between the outlet of the dust collection chamber and atmospheric air; wherein the dust collection chamber has a substantially circular cross section, the inlet to the dust collection chamber is at the perimeter of the circle and the outlet of the dust collection chamber is from the middle of the circle.

Additionally, the present invention also provides a dust extraction module for use with a power tool, the dust extraction module comprising: a dust collection chamber having an inlet connectable in fluid communication with an outlet of a dust-extracting duct of the power tool, and having an outlet in fluid communication with atmospheric air; and a filter locatable in fluid flow between the outlet of the dust collection chamber and the atmospheric air; wherein the dust collection chamber has a substantially circular cross section, the inlet to the dust collection chamber is at the perimeter of the circle and the outlet of the dust collection chamber is from the middle of the circle.

These aforementioned aspects of the present invention are at least partially achieved by a dust collection chamber with a substantially circular cross section, the inlet to the dust collection chamber is at the perimeter of the circle and the outlet of the dust collection chamber is near the middle of the circle. With this arrangement, dust-laden air entering the dust collection chamber is caused to swirl around in a circular manner and forced against the outer wall of the dust collection chamber under the action of centrifugal force before air is exhausted from the dust collection chamber through the filter to atmosphere. Thus the air encountering the filter is less dust-laden than if the air encountered the filter directly. The throughput of air through the dust extraction system and the performance thereof are accordingly enhanced, and the filter is not subject to clogging as rapidly as existing systems.

Since the below described dust extraction system uses a "dirty fan" operation, wherein the dust-laden air encounters the fan before it is filtered, it does not have the disadvantages of the dust extraction system described hereabove, wherein the vacuum source 700, which performs the same function as the fan in the invention, is located after the separation means 600, where the dust is extracted.

In a preferred embodiment of the present invention, the cross-sectional area of the inlet to the dust collection chamber is greater than or equal to the cross-sectional area of the inlet to the duct and/or the cross-sectional area of the outlet from the dust collection chamber is greater than or equal to the cross-sectional area of the inlet thereto and/or the cross-sectional area of the outlet from the dust collection chamber is greater than or equal to the cross-sectional area of the inlet to the duct. Thus in the most preferred of these alternatives where all three conditions are true, the cross-sectional area of the pathway of the dust-laden air from the point of contact between the working element and the workpiece to atmospheric air always increases. This helps to increase the throughput of the dust extraction system and counters the effects of filter clogging still further.

In another preferred embodiment, the inlet to the dust collection chamber is located above a horizontal plane having at least two-thirds of the interior volume of the dust collection chamber above the plane. This ensures that dust collected in the dust collection chamber is held therein and cannot fall back down the duct under the action of gravity when the fan is switched off. The higher the inlet to the dust collection chamber is located above the horizontal plane, the greater the amount of dust which can be held in the dust collection chamber and the better the effect achieved.

In yet another preferred embodiment, the exterior of the dust collection chamber is substantially symmetrical about a vertical plane containing the longitudinal axis of the power tool, allowing the power tool to be used by a left- or by a right-handed person without the appendage of the dust collection chamber providing an obstruction preventing the power tool from being held with comfort. In such a case, if the dust collection chamber is detachable from the power tool, the outlet of the duct and the inlet to the dust collection chamber can have complementary asymmetric profiles, to ensure that the dust collection chamber is attachable to the outlet of the duct in only one possible configuration. Thus although the dust collection chamber is apparently symmetrical from outside, it cannot be fitted to the power tool upside-down, which might undesirably place the inlet to the dust collection chamber below a horizontal plane having at least two-thirds of the interior volume of the dust collection chamber above that plane. However, this option may also be used even if the dust collection chamber is not substantially symmetrical to ensure its correct fitment.

In a still further preferred embodiment adapted to allow for equally comfortable use of the power tool by both left- and right-handed users, the exterior of the dust collection chamber may be asymmetric about a vertical plane containing the longitudinal axis of the power tool, with the dust collection chamber detachable from the power tool, and the dust collection chamber attachable to the outlet of the duct in two possible alternative configurations, one configuration being for use of the power tool by a left-handed person, and the other configuration being for use of the power tool by a right-handed person.

Additionally, the duct may be contained within a handle of the power tool, thereby saving space and materials during manufacture.

In a preferred embodiment, the dust collection chamber is provided with an anti-static or conductive coating, or with an earthing wire, thereby mitigating this effect, since the dust extraction technique of the present invention is liable to generate a build-up of static electricity in the dust collection chamber.

The dust collection chamber may also be made at least partially transparent to allow a user to see how full it is and when it needs emptying. In such a case, the transparent parts of the dust collection chamber are preferably made of polypropylene, which is found to be a good material for resisting the effects of static build-up just described. The dust collection chamber may also be at least partially made of glass-filled nylon, which has a similar beneficial property.

Preferably, the dust collection chamber comprises a door or lid, which allows a user to empty it. In a preferred embodiment, the filter is removable from the dust collection chamber and replaceable, which also allows a user to clean it and replace it or to discard it completely and replace it with a new filter.

The filter may be of any conventional type, such as a fabric filter, a pleated filter or a mesh. The filter may also comprise a first filter element for filtering course dust and a second filter element for filtering finer dust than the first filter element, or further additional stages of filtration to improve performance still further.

In a preferred embodiment, the dust collection chamber is substantially in the shape of a cylinder having a longitudinal axis oriented substantially horizontally with respect to the power tool, the inlet to the dust collection chamber is located on the curved surface of the cylinder, and the outlet of the dust collection chamber is located on an end face of the cylinder. Thus in this preferred configuration, the dust collection chamber may be arranged in an ergonomically desirable position on the power tool with the outlet of the dust collection chamber venting to atmospheric air in a substantially horizontal direction away from a user for maximum comfort.

In an alternative preferred embodiment, the dust collection chamber is substantially in the shape of a drum having an axis of rotational symmetry oriented substantially vertically with respect to the power tool, the inlet to the dust collection chamber is located on the curved surface of the drum, and the outlet of the dust collection chamber is located on the upper face of the drum. Thus, in this configuration, the dust collection chamber may be arranged in an ergonomically desirable position on the power tool with the outlet of the dust collection chamber venting to atmospheric air in a substantially vertical direction away from the surface of the workpiece, in order to avoid disturbing dust being created at the point of contact between a working element being held by the power tool and the workpiece.

In either case described above, the filter may be located centrally within the dust collection chamber coaxially with the axis of the dust collection chamber. This creates an advantage by keeping the filter away from the parts of the dust collection chamber where the airspeed of the dust-laden air is greatest, thereby minimizing the chance of the filter becoming blocked and improving performance.

Preferably, if the dust collection chamber is substantially in the shape of a cylinder, it may contain a second smaller cylinder, the second smaller cylinder having the same orientation as and being coaxial with the first cylinder, the second cylinder being open at one end thereof to the interior of the dust collection chamber and at the other end thereof providing the outlet from the dust collection chamber, with the filter located across or around the outlet. Alternatively, if the dust collection chamber is substantially in the shape of a drum, it may contain a second smaller drum, the second smaller drum having the same orientation as and being coaxial with the first the drum, the second drum being open on the lower face thereof to the interior of the dust collection chamber and on the upper face thereof providing the outlet from the dust collection chamber, with the filter located across or around the outlet. In both of these cases, the performance of the dust extraction is improved because the second smaller cylinder or drum helps to keep dust away from the filter, thereby reducing clogging still further.

The fan is preferably located on a drive shaft of a motor of the power tool, wherein the motor also provides the necessary power for the working head of the power tool, thereby remaining compact and lighter with respect to overall weight as the prior art systems. Moreover, the same drive shaft may carry a second fan operable to cool the motor. However, it is desirable that the second fan is preferably contained in a chamber of the power tool which is sealed from fluid communication with the duct forming part of the dust extraction system. This ensures that dust-laden air is not used to cool the motor.

The dust collection module according to the second aspect of the invention may be adapted to fit more than one different power tool, in order to allow it to be interchanged between power tools.

While the invention has been described in detail and with reference to specific embodiments thereof, it will be apparent to one skilled in the art that various changes and modifications can be made therein without departing from the spirit and scope thereof. For example, it is to be understood that terms such as "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

BRIEF DESCRIPTION OF THE DRAWINGS

Further features and advantages of the present invention will become apparent from the followed detailed description, given in association with the accompanying drawings, wherein:

FIG. 11 is a perspective view of another embodiment of the invention;

DETAILED DESCRIPTION OF THE INVENTION

Figure 1:
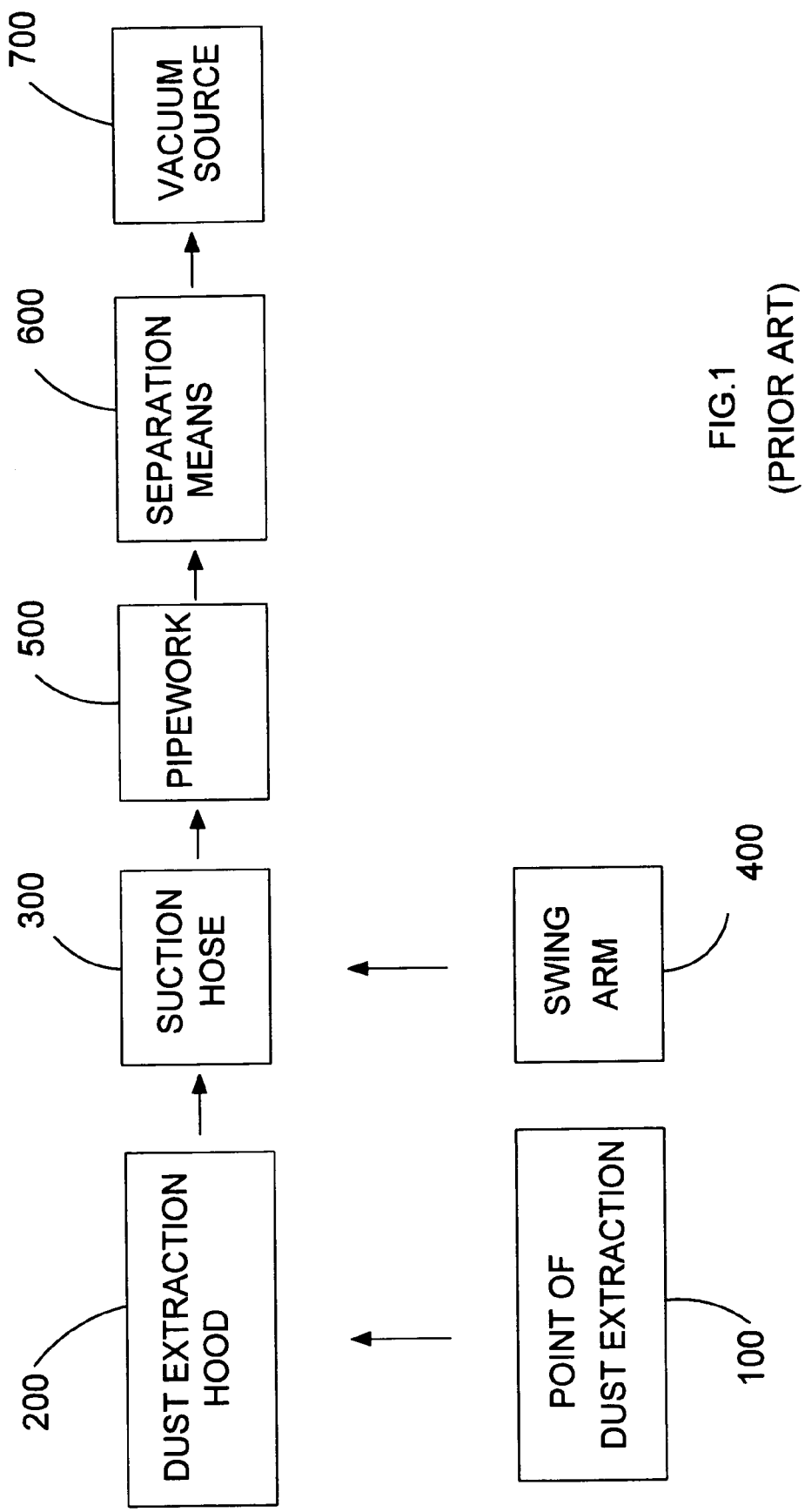
FIG. 1 is a schematic representation of a first prior art dust extraction system.
Figure 2:
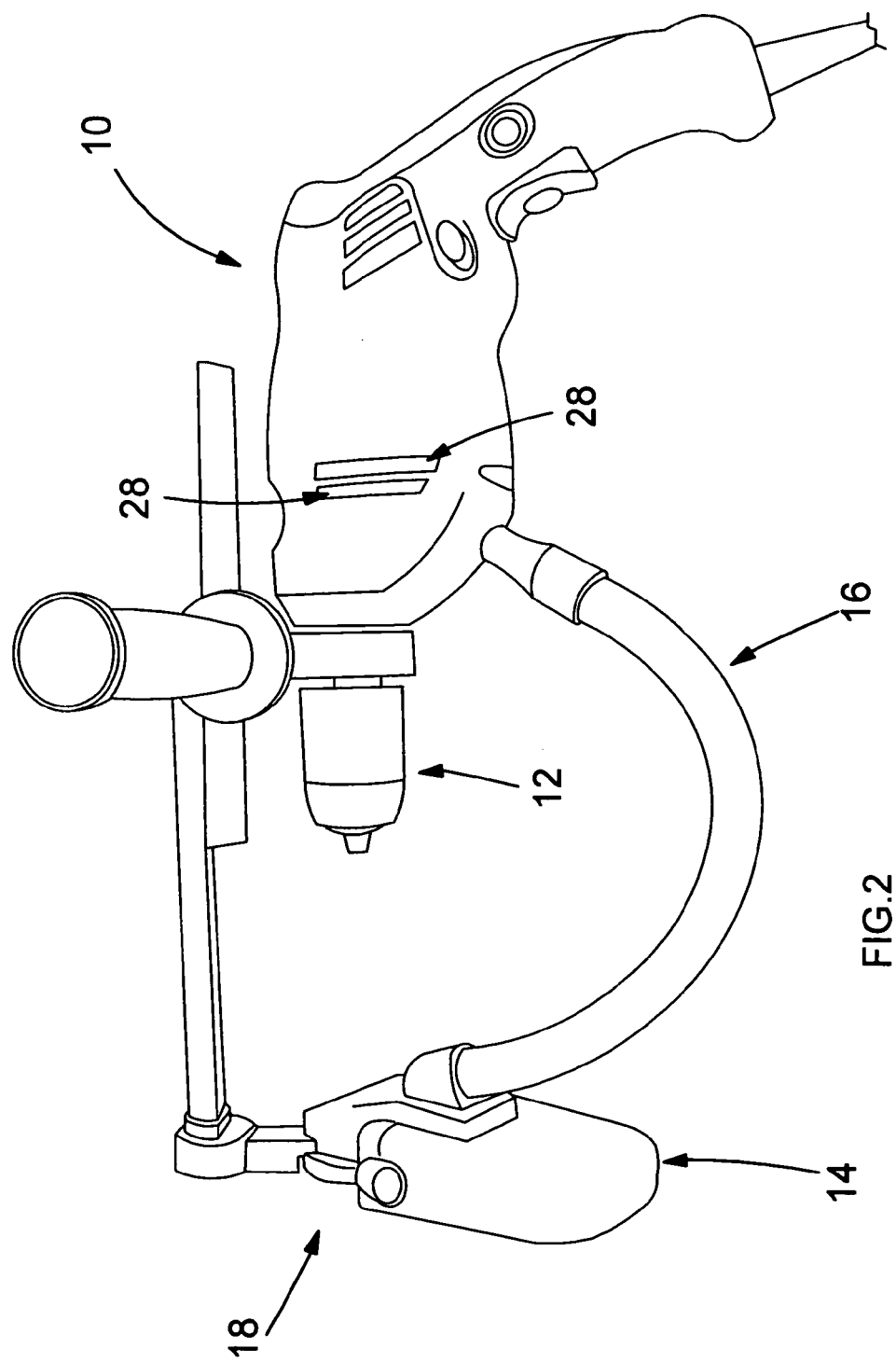
FIG. 2 shows a second prior art dust extraction system used in combination with a drill.
Figure 3:
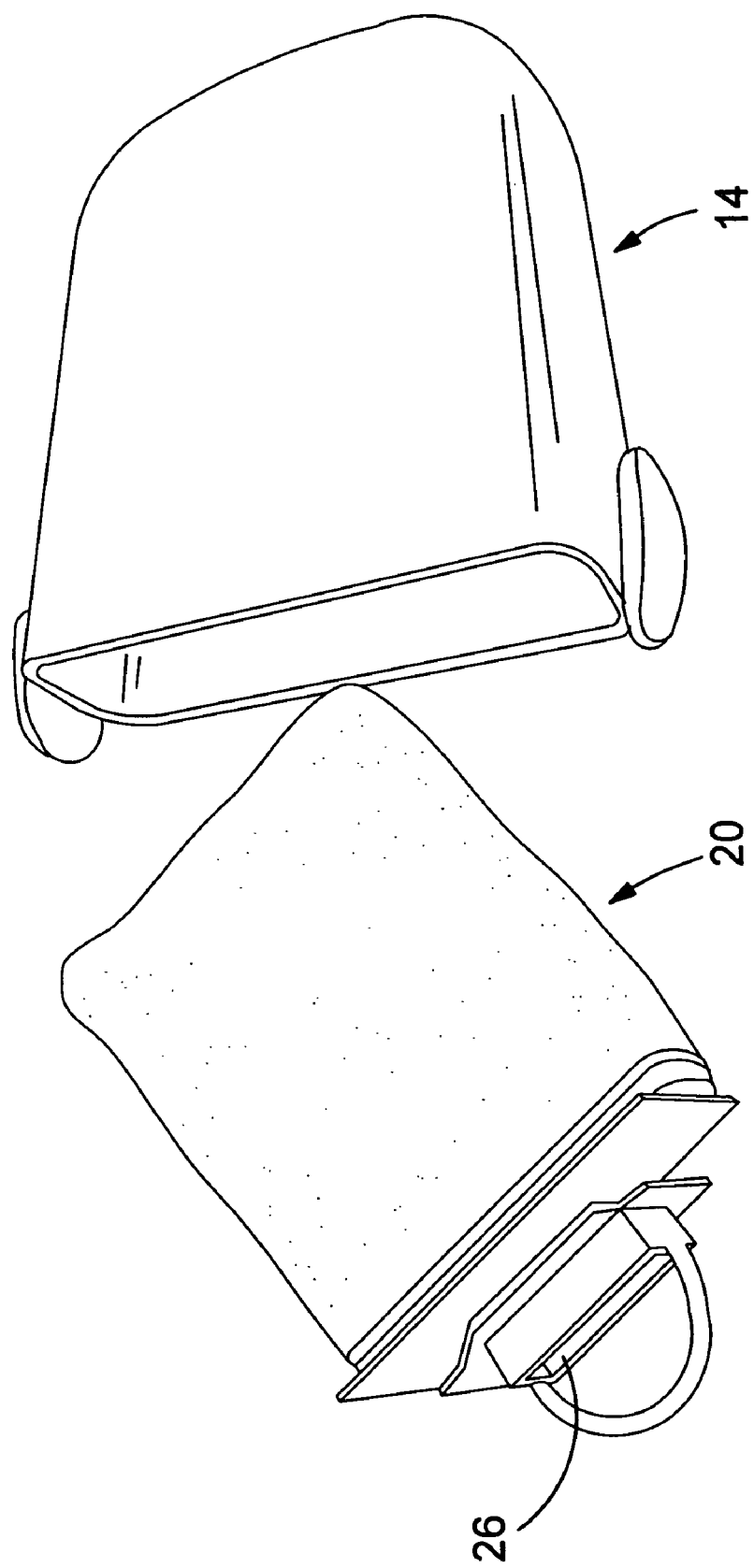
FIG. 3 shows the disassembled dust collection chamber and filter bag of the dust extraction system of FIG. 2.
Figure 4:
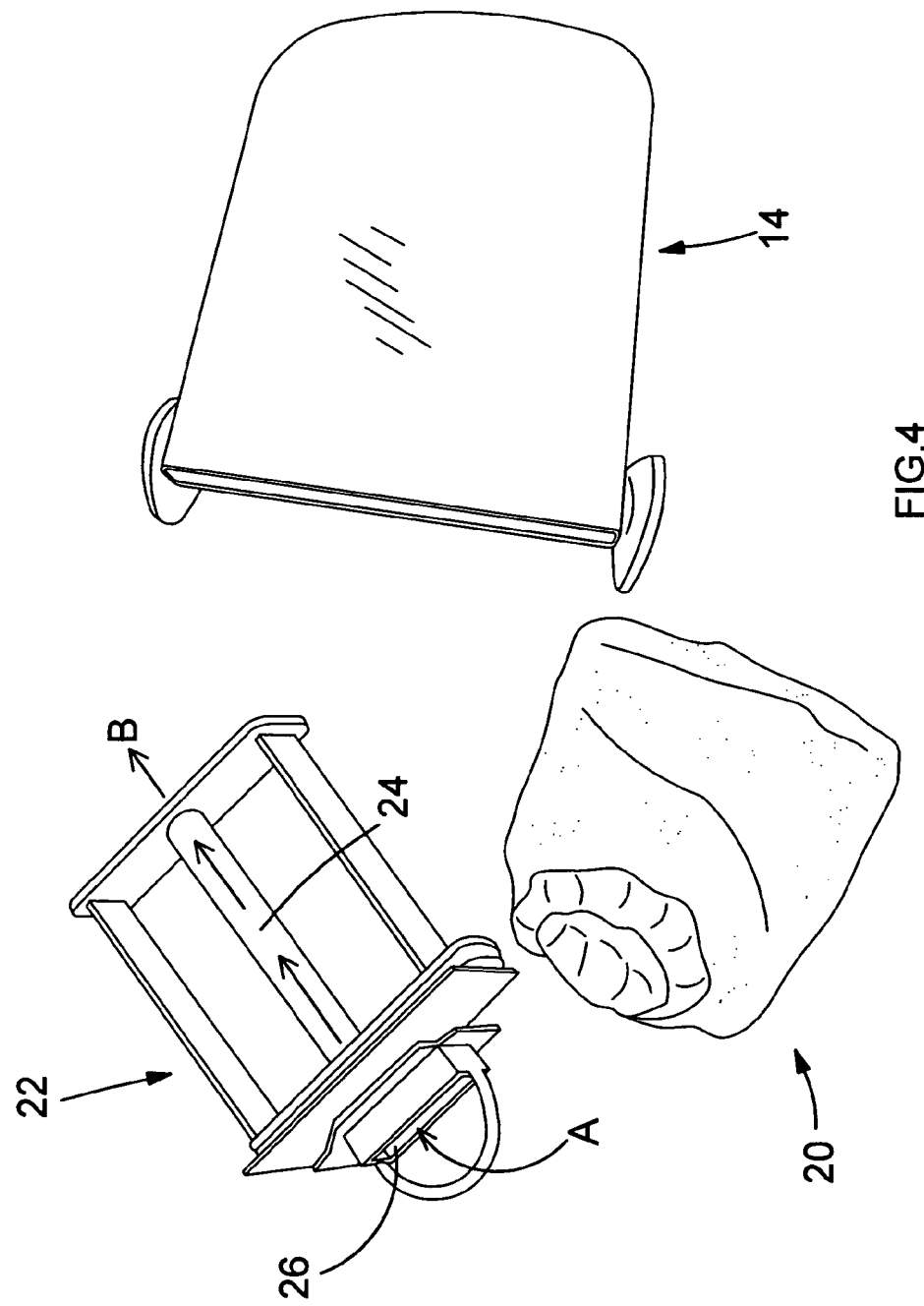
FIG. 4 shows the disassembled dust collection chamber and filter bag of the dust extraction system of FIGS. 2 and 3 to show the plastic frame contained in the bag during operation of the dust extraction system.
Figure 5:
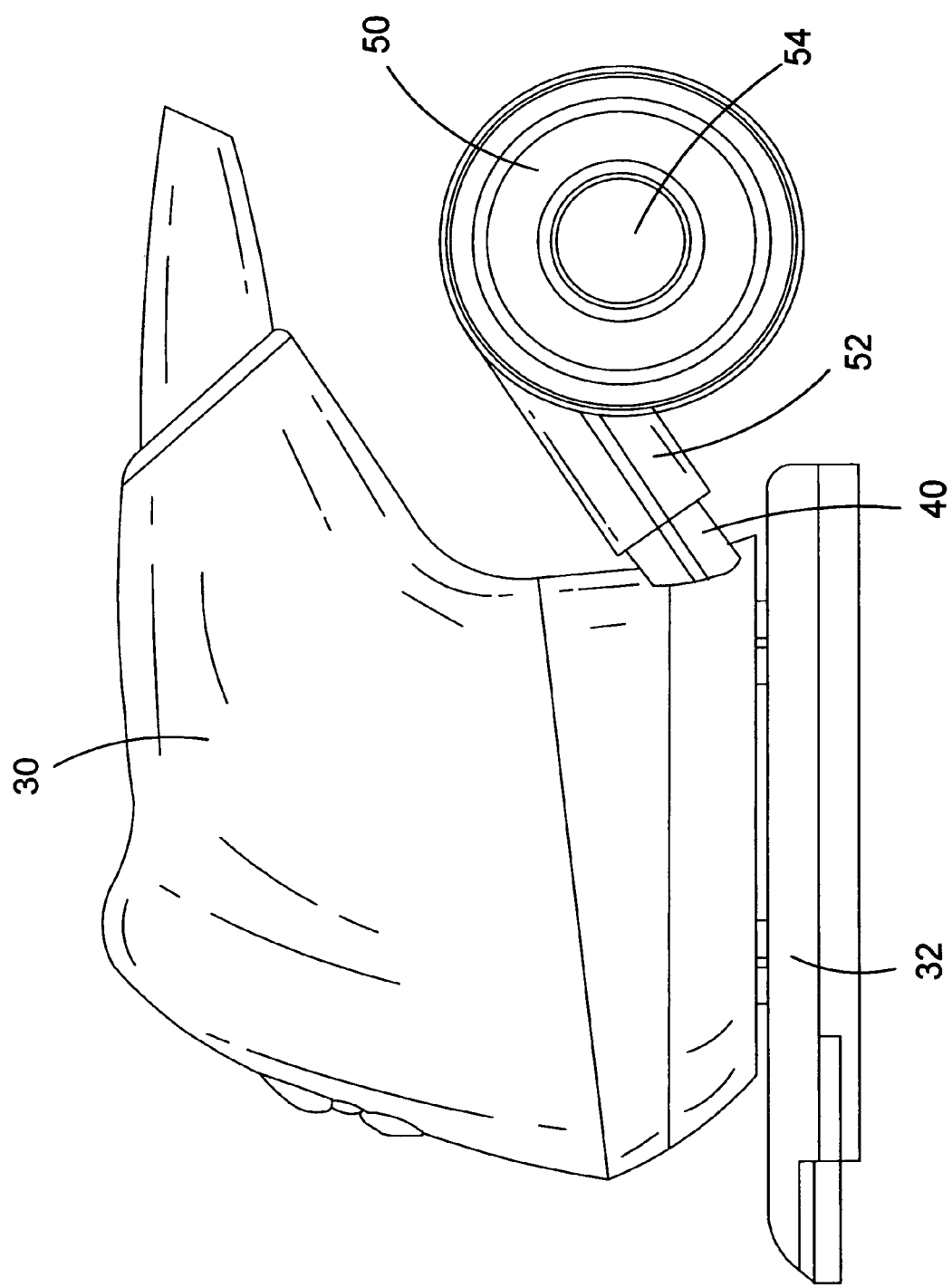
FIG. 5 is a side view of the first embodiment of the present invention.
Figure 6:
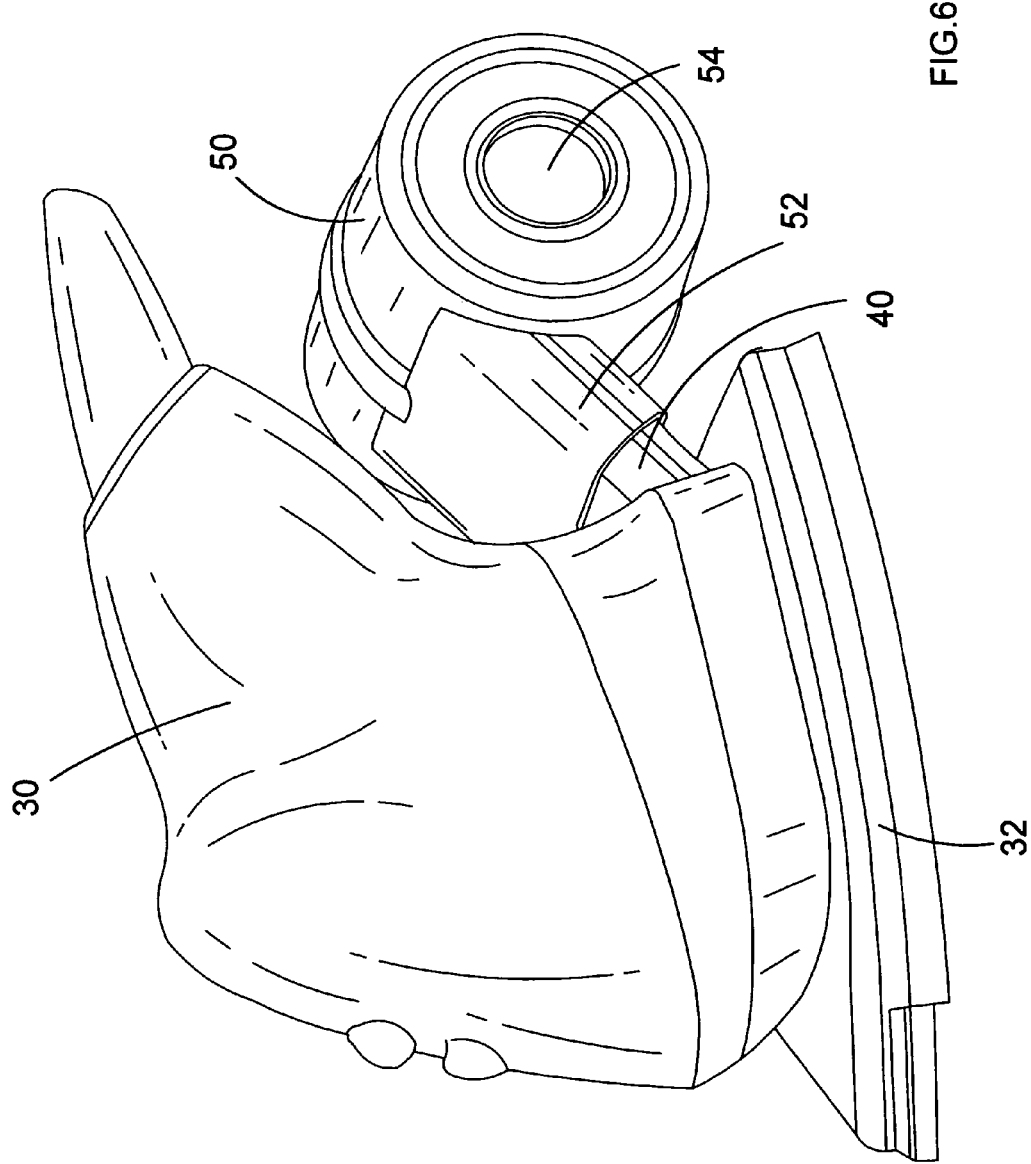
FIG. 6 is a perspective view of FIG. 5.

Referring to FIGS. 5 and 6, there is shown a power tool 30, which in this embodiment is a sander, having a working head 32, here a platten, for holding a working element, namely a sheet of sandpaper. A duct 40 has an inlet locatable in close proximity to the point of contact between the sheet of sandpaper and a workpiece by the provision of through-holes formed in the platten 32 in a conventional manner. A dust collection chamber 50 has an inlet 52 in fluid communication with an outlet from said duct, and an outlet 54 in fluid communication with atmospheric air. In this embodiment, the dust collection chamber 50 is substantially in the shape of a cylinder having a longitudinal axis oriented substantially horizontally with respect to the power tool, the inlet 52 to the dust collection chamber is located on the curved surface of the cylinder, and the outlet 54 of the dust collection chamber is located on an end face of the cylinder.

Figure 7:
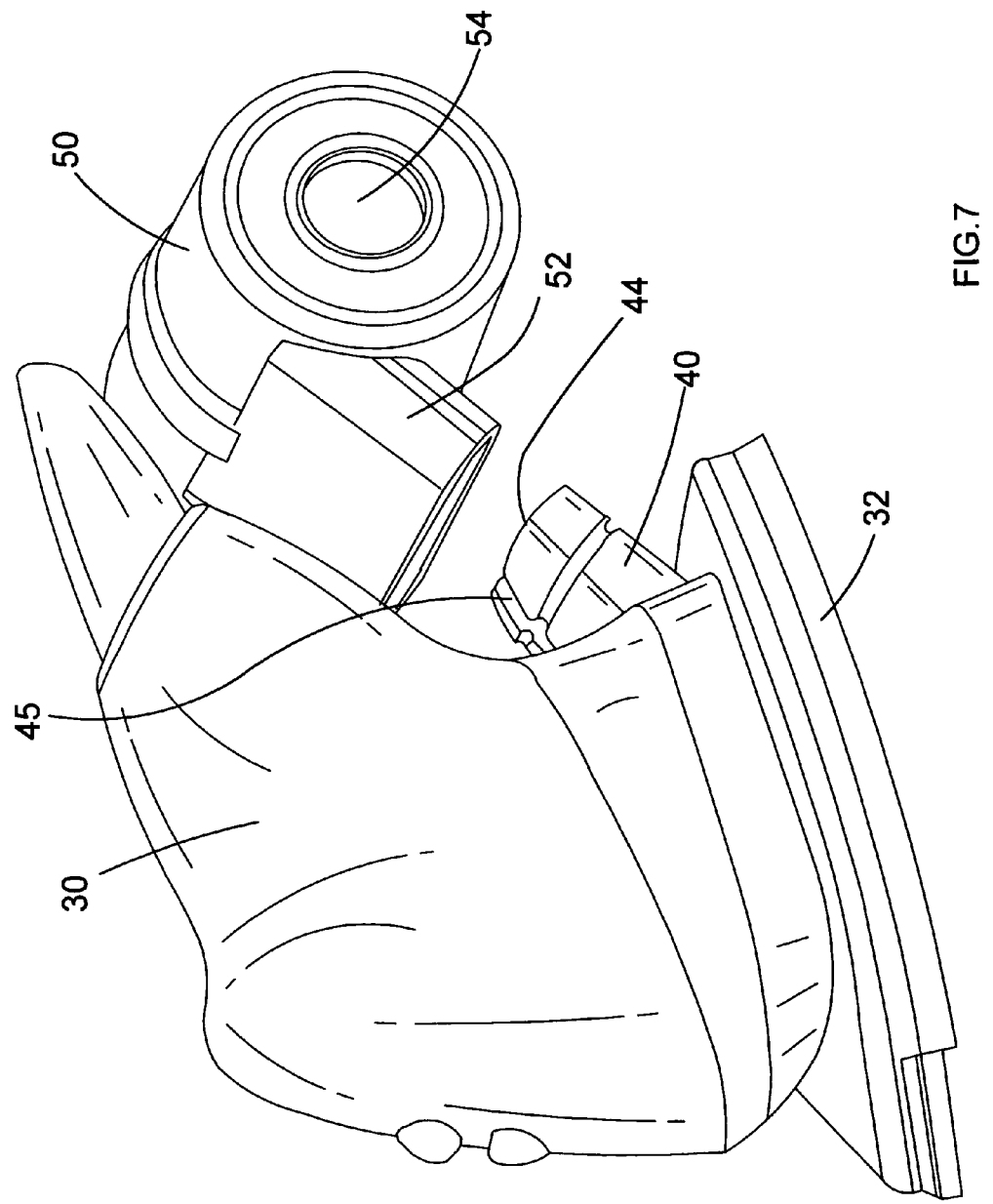
FIG. 7 is an exploded view of the embodiment as shown in FIGS. 5 and 6.

FIG. 7 shows an exploded view of the same embodiment as shown in FIGS. 5 and 6, where the dust collection chamber 50 has been detached from the duct 40. This shows the manner of connection of the inlet 52 of the dust collection chamber 50 to the outlet 44 of the duct 40, and in particular that outlet 44 is provided with a groove 45 which is offset to one side of a vertical plane containing the longitudinal axis of the power tool 30. Groove 45 has a complementary profile to a ridge not visible in FIG. 7 provided on the interior of inlet 52, so that the dust collection chamber 50 is only attachable to the outlet of the duct 40 in one possible configuration, namely that shown in FIG. 6. This prevents the dust collection chamber 50 from being attached to the outlet 44 upside down.

The cross-sectional area of the outlet 54 of the dust collection chamber 50 is also greater than the cross-sectional area of inlet 52, which is in turn itself larger than the combined cross-sectional area of the through-holes formed in platten 32. Thus the cross-sectional area of the pathway for dust-laden air from the platten to atmospheric air always increases and the throughput of the dust extraction system is thereby also improved.

Figure 8:
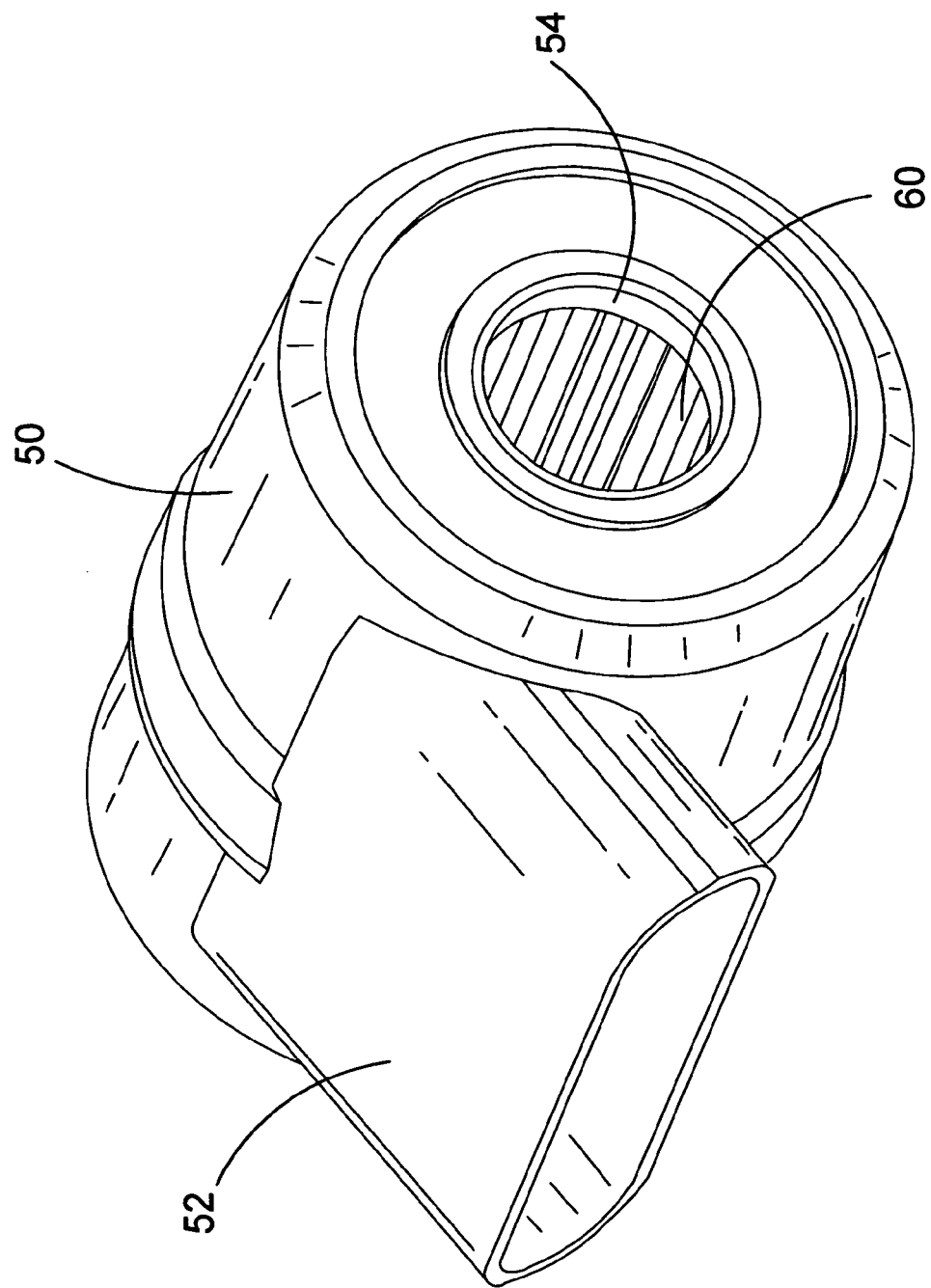
FIG. 8 is a perspective view of the dust collection chamber of the embodiment of FIGS. 5 to 7.

FIG. 8 is a more detailed view of the dust collection chamber 50 of this embodiment. As may be seen from FIGS. 8 and 9, the interior of the outlet 54 of the dust collection chamber reveals a pleated filter 60, having a generally cylindrical shape. The filter 60 comprises a pleated filter element 601 shaped into the curved surface of a cylinder and a blank wall 602 which forms one of the end faces of said cylinder. The other end face thereof is open to the outlet 54 of the dust collection chamber, as shown more clearly in FIG. 8.

Figure 9:
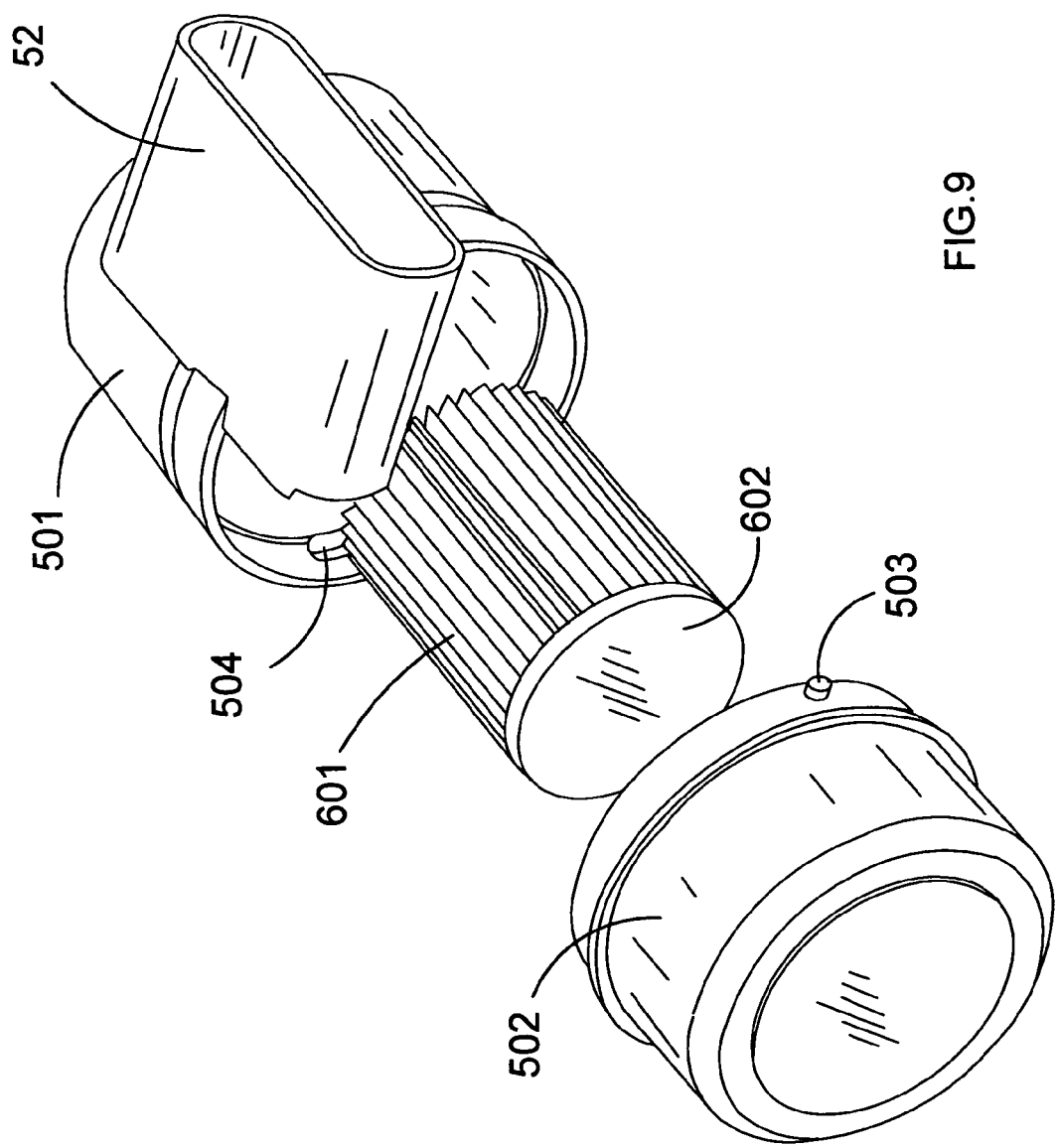
FIG. 9 is an exploded view of the dust collection chamber shown in FIG. 8.

FIG. 9 also shows that the dust collection chamber 50 comprises a lid 501 and a body portion 502, which allows the dust collection chamber 50 to be opened by a user and emptied. Body portion 502 is transparent or partially transparent, allowing a user to see the level of dust collected in the chamber and therefore when it needs emptying. Moreover, filter 60 is removable from the dust collection chamber 50 and replaceable, which also allows a user to clean it and replace it or to discard it completely and replace it with a new filter.

Finally, FIG. 9 further shows the method of attachment of lid 501 to body portion 502 of the dust collection chamber 50. Body portion 502 is provided on opposite sides of the rim thereof with a pair of lugs 503, one of which can be seen in FIG. 9. Lugs 503 engage with a pair of corresponding tracks 504 formed in lid 501, one of which tracks 504 can also be seen in FIG. 9. It should be appreciated that additional means of attachment as known to those skilled in the art can be used to achieve the same effect, e.g., threads, hinges, friction.

Figure 10:
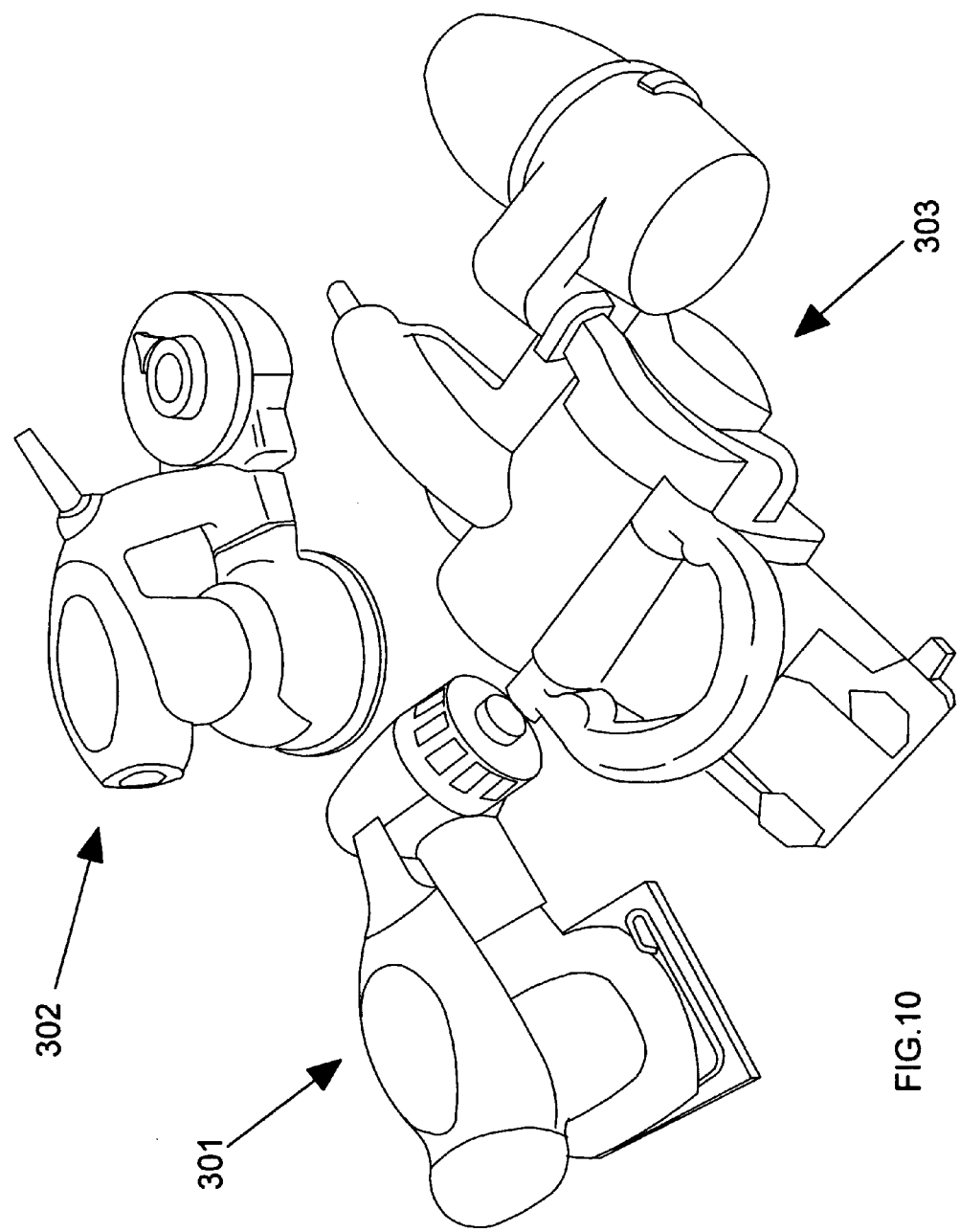
FIG. 10 is a general view of power tools according to additional embodiments of the invention.

FIG. 10 is a general view of second, third and fourth embodiments of the invention, showing three power tools labelled 301, 302 and 303. 301 is a quarter-sheet sander, 302 is a random-orbit sander and 303 is a belt sander. All are provided with dust extraction systems in accordance with the invention. As can be seen from FIG. 10, the dust collection chambers of sanders 301 and 303 are generally in the shape of a cylinder having its longitudinal axis oriented substantially horizontally with respect to the sander, with the inlet to the dust collection chamber located in both cases on the curved surface of the cylinder, and the outlet of the dust collection chamber located on an end face of said cylinder. However, in the case of sander 301, the dust collection chamber is oriented with its longitudinal axis substantially perpendicular to the axis of the sander, whereas in the case of sander 303, the dust collection chamber is oriented with its longitudinal axis substantially parallel to the axis of the sander. Thus the dust collection chamber of sander 301 vents sideways to atmospheric air, whereas the dust collection chamber of sander 303 vents to atmospheric air in a forward direction with respect to the orientation of the sander.

It may also be seen from FIG. 10 that although the dust collection chambers of sanders 301 and 303 are substantially cylindrical in shape, they are not exactly so, and are instead slightly tapered in a direction away from the end face of the chamber where the outlet thereof is located. This is for aesthetic and/or ergonomic reasons and does not affect the efficiency of the dust extraction achieved with these embodiments.

Sander 302 shown in FIG. 10 is instead provided with a dust collection chamber substantially in the shape of a drum having an axis of rotational symmetry oriented substantially vertically with respect to sander 302, the inlet to said dust collection chamber being located on the curved surface of said drum, and the outlet of said dust collection chamber being located on the upper face of said drum. Thus the dust collection chamber of sander 302 vents to atmospheric air in a vertical direction.

FIG. 11 is a perspective view of quarter-sheet sander 301. As may be seen from FIG. 11, the dust collection chamber 50 contains a second smaller cylinder 56, which has the same orientation as and is coaxial with the outer wall of the dust collection chamber, and is open at one end 58 thereof to the interior of the dust collection chamber and at the other end thereof provides the outlet from the dust collection chamber. The filter 60 is located around said outlet.

Figure 12B:
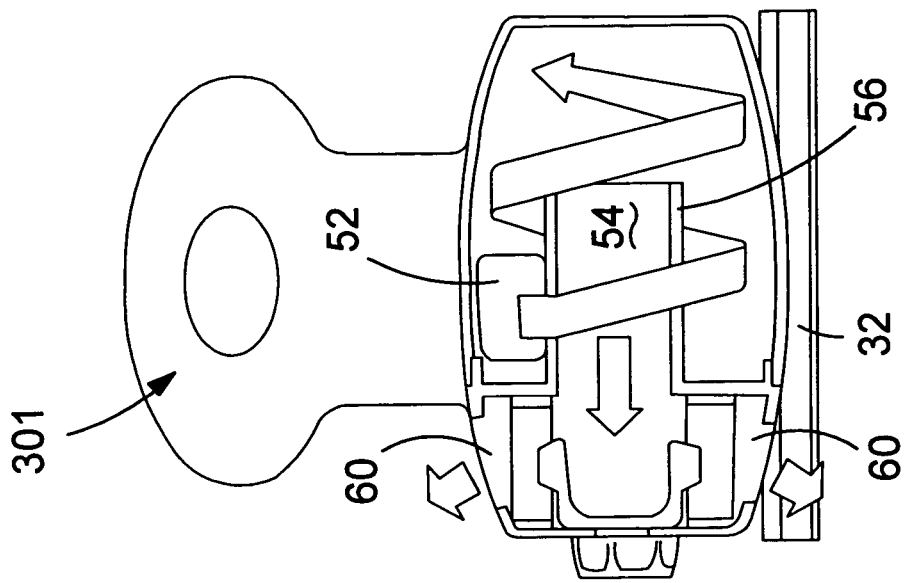
FIG. 12B is a partially cut-away rear view of the embodiment of the invention illustrated in FIG. 11.
Figure 12A:
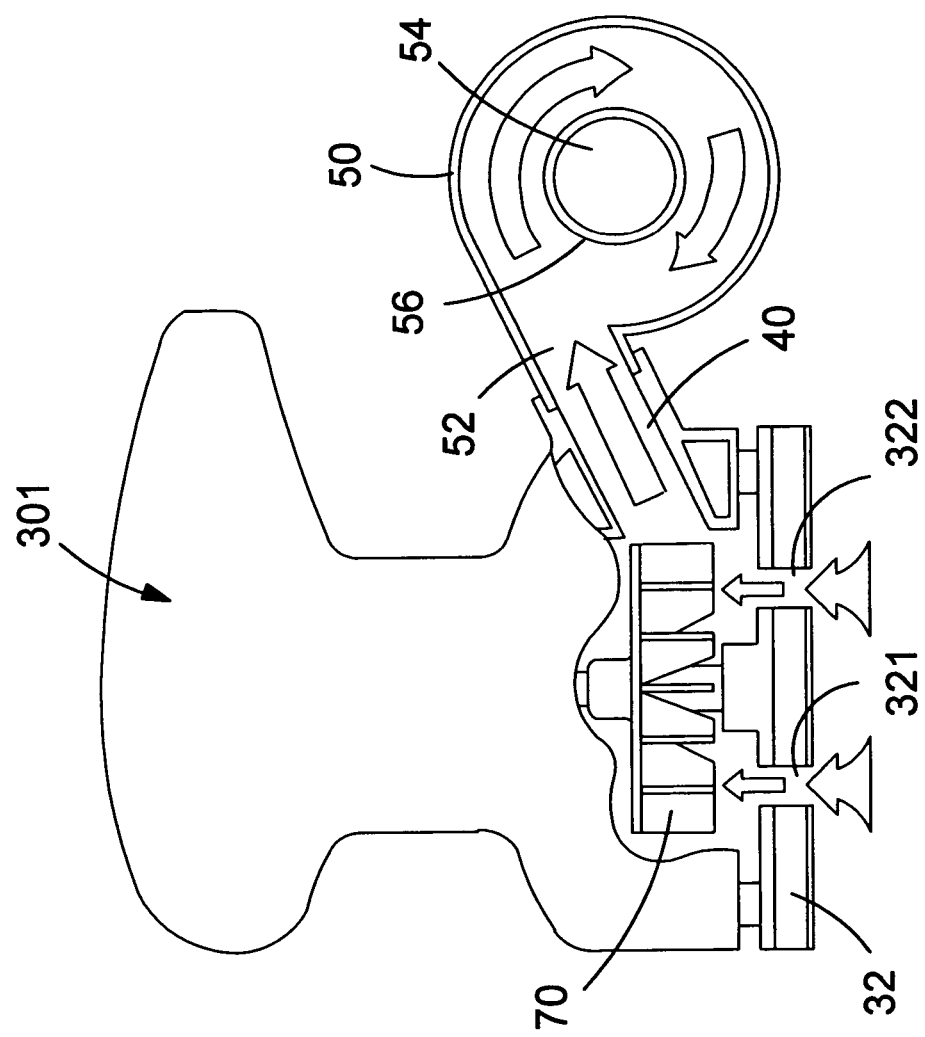
FIG. 12A is a partially cut-away side view of the embodiment of the invention illustrated in FIG. 11.

FIG. 12A is a partially cut-away view of sander 301 seen from one side thereof and showing airflow within the dust extraction system during operation of sander 301. Dust-laden air is drawn by fan 70 from a point of contact between a sheet of sandpaper held by the platten 32 of the sander and a workpiece through holes 321, 322 formed in the platten, and passes up through duct 40 into dust collection chamber 50. Here, the air circulates around second smaller cylinder 56, before leaving the dust collection chamber 50 through outlet 54.

FIG. 12B is a partially cut-away view of sander 301 seen from the rear thereof, which shows the airflow within the dust collection chamber 50 more clearly. Dust-laden air entering the dust collection chamber through inlet 52 swirls around the second smaller cylinder 56 within chamber 50 and is deposited in the bottom thereof. Inlet 52 is located well above a horizontal plane having at least two-thirds of the interior volume of the dust collection chamber above that plane, so that when fan 70 is switched off, the dust is unable to return back down duct 40 under the action of gravity. Finally, air is exhausted from the dust collection chamber through outlet 54 located in the middle of the chamber and passes through filter 60 which is located around said outlet.

Figure 13:
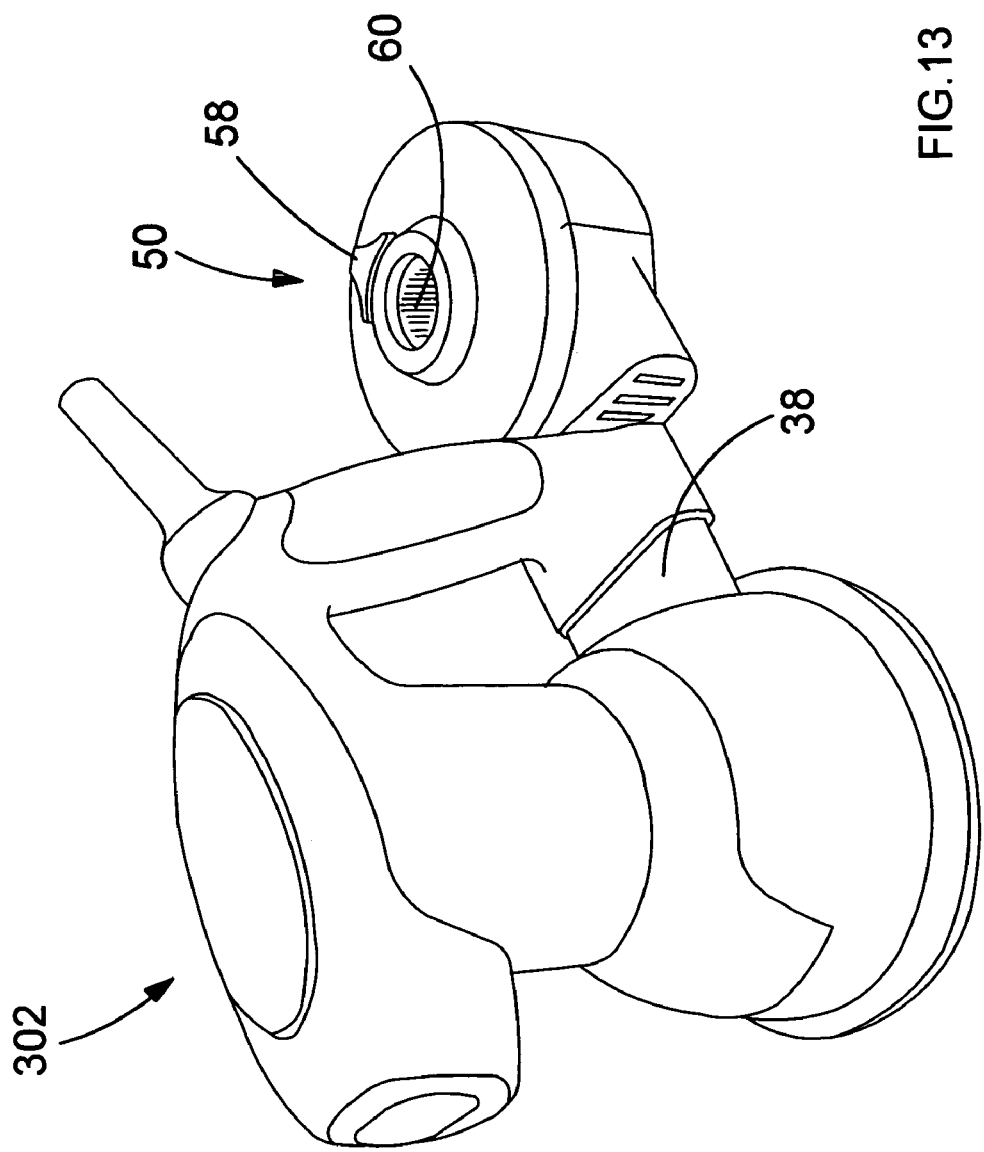
FIG. 13 is a perspective view of yet another embodiment of the invention.

FIG. 13 is a perspective view of random-orbit sander 302. As may be seen from FIG. 13, the duct 40 connecting the working head of the sander with the dust collection chamber 50 is contained within a handle 38 of the sander. Dust collection chamber 50 further comprises a filter cleaning lever 58 for agitating filter 60 contained therein. When lever 58 is moved by a user in a circumferential direction, a tongue attached to level 58 knocks against pleats formed in the filter 60, thereby dislodging dust blocking the filter and causing it to fall down into the dust collection chamber.

Figure 14:
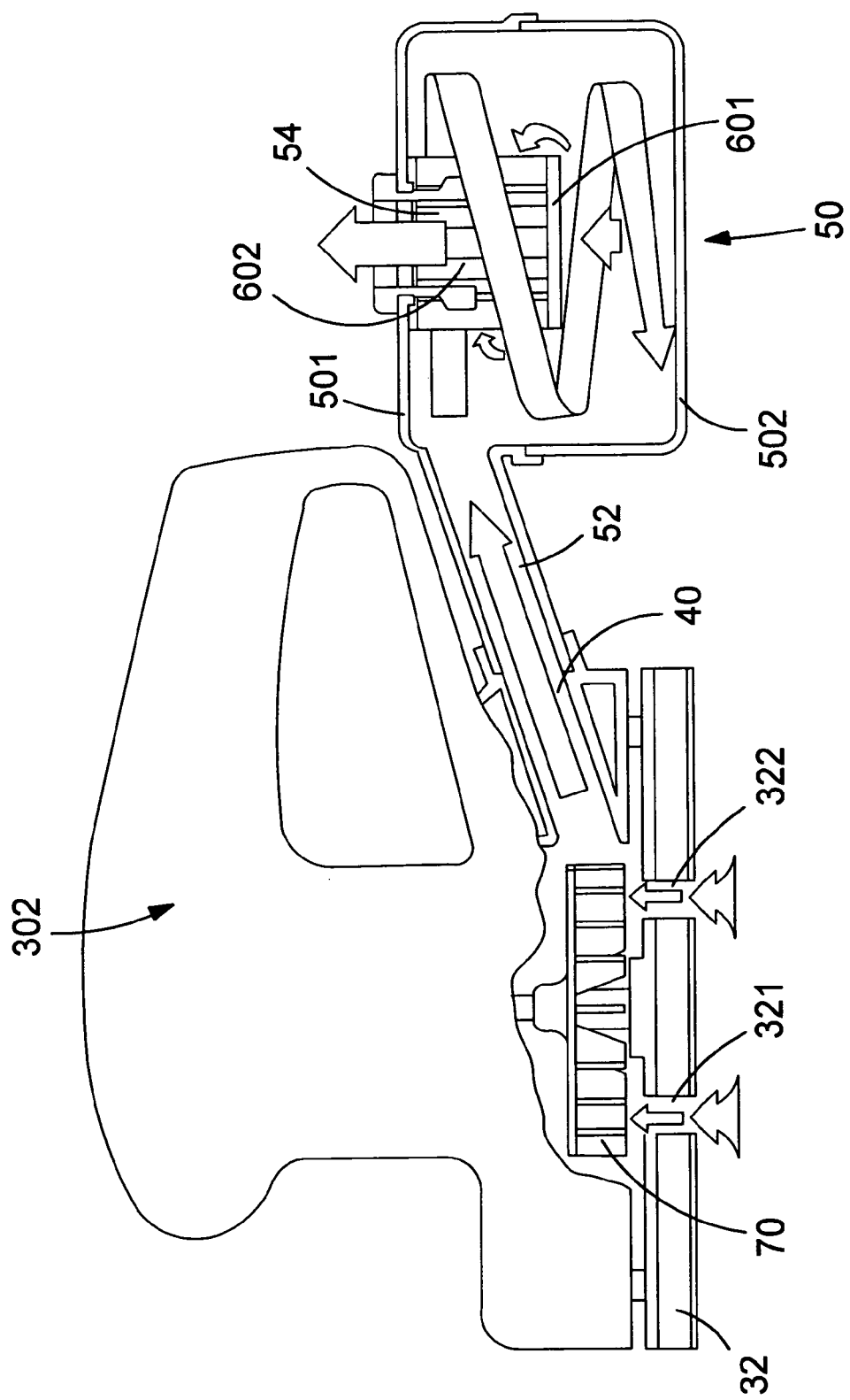
FIG. 14 is a partially cut-away side view of the embodiment of the invention illustrated in FIG. 13.

FIG. 14 is a partially cut-away view of sander 302 seen from one side thereof and shows airflow within its dust extraction system during operation of sander 302. Dust-laden air is drawn by fan 70 from a point of contact between a sheet of sandpaper held by platten 32 and a workpiece through holes 321, 322 formed in the platten, and passes up through duct 40 into the inlet 52 of dust collection chamber 50. Dust collection chamber 50 is formed substantially in the shape of a drum having an axis of rotational symmetry oriented substantially vertically with respect to sander 302, with the inlet 52 to the dust collection chamber located on the curved surface of the drum, and the outlet 54 thereof located on the upper face of said drum. Dust collection chamber 50 contains a pleated filter having a generally cylindrical shape and which comprises a pleated filter element 601 shaped into the curved surface of a cylinder and a blank wall 602 which forms one of the end faces of said cylinder. The other end face thereof is open to the outlet 54 of the dust collection chamber 50. Hence, dust-laden air entering dust collection chamber 50 through inlet 52 swirls around the filter within chamber 50 and the dust is deposited in the bottom thereof, before the air passes through filter element 601 and is exhausted to atmospheric air through outlet 54.

It can also be seen from FIG. 14 that dust collection chamber 50 comprises a lid 501 and a body portion 502, which allows the dust collection chamber 50 to be opened by a user and emptied. As may be seen in FIG. 13, body portion 502 is transparent, allowing a user to see the level of dust collected in the chamber and therefore when it needs emptying.

Figure 15:
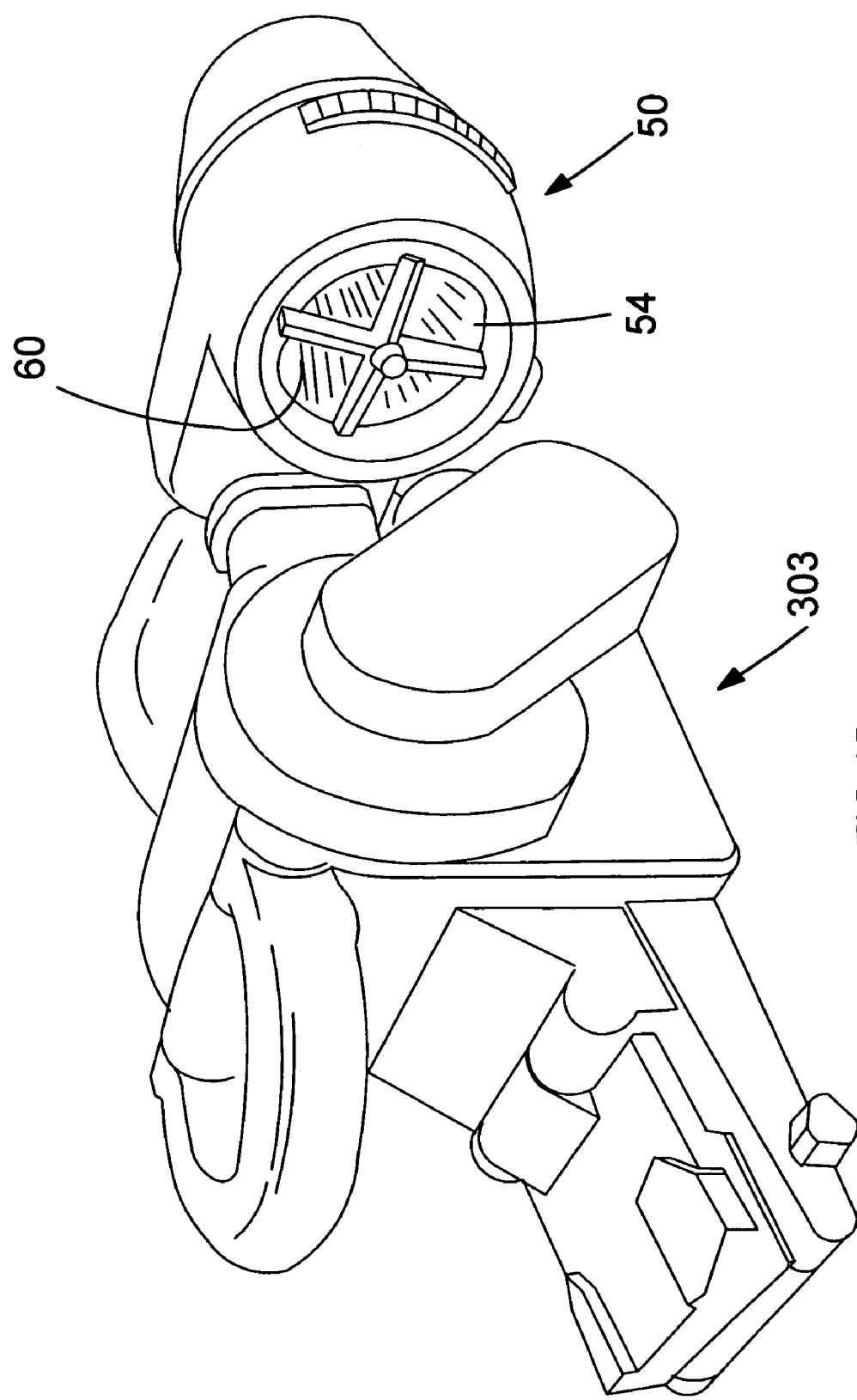
FIG. 15 is a perspective view of another embodiment of the invention.

FIG. 15 is a perspective view of belt sander 303, showing dust collection chamber 50 to advantage. As can be seen in FIG. 15, outlet 54 of dust collection chamber 50 reveals a pleated filter 60.

Figure 16:
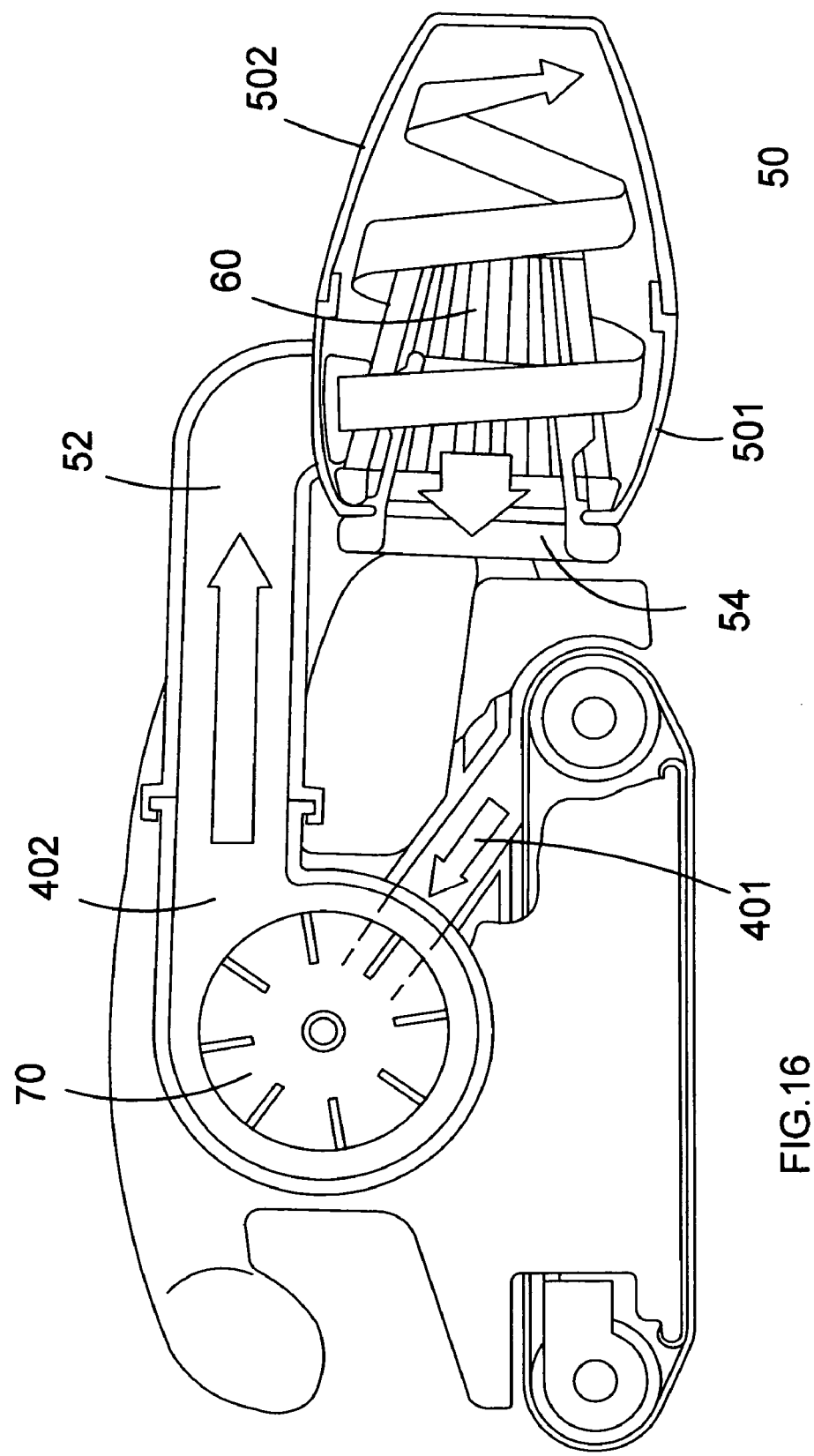
FIG. 16 is a partially cut-away side view of the embodiment of the invention illustrated in FIG. 15.

FIG. 16 is a partially cut-away view of sander 303 seen from one side thereof and shows airflow within its dust extraction system during operation of sander 303. As may be seen from FIG. 16, duct 40 comprises a first length 401 thereof connecting the region where dust is generated by the sander with a chamber housing fan 70 and a second length 402 thereof connecting the fan chamber with the inlet 52 of the dust collection chamber 50. Filter 60 contained within dust collection chamber 50 has the shape of a truncated cone (or frustroconical). Thus dust laden air is drawn firstly up length 401 of duct 40 into the chamber of fan 70 and thence through the second length 402 of duct 40 into dust collection chamber 50, where it swirls around filter 60 and the dust is deposited in the bottom of chamber 50, before the air passes through the pleated filter 60 and is exhausted to atmospheric air through outlet 54. Once again, dust collection chamber 50 comprises a lid 501 and a body portion 502, which allows the dust collection chamber 50 to be opened by a user and emptied. As may also be seen from FIG. 15, body portion 502 is transparent, allowing a user to see the level of dust collected in the chamber and therefore when it needs emptying.

It is understood that those ordinarily skilled in the art would recognize modifications and variations of the above-described preferred embodiments of the invention and that such modifications and variations would fall within the scope described hereabove. Thus, it is intended that the present invention covers the modifications and variations of this invention that come within the scope of the appended claims and their equivalents.

I claim:

1. A power tool comprising:
   a working head for holding a working element;
   a duct having an inlet locatable in proximity to a point of contact between the working element and a workpiece;
   a dust collection chamber having an inlet in fluid communication with an outlet from said duct and an outlet in fluid communication with atmospheric air;
   a fan operable to transport air from the inlet of said duct to the outlet from said duct; and
   a filter fluidly connected between the outlet of said dust collection chamber and atmospheric air; and,
   wherein the dust collection chamber has a substantially circular cross section, the inlet to said dust collection chamber is at a perimeter of said dust collection chamber and the outlet of said dust collection chamber is proximate a middle of said dust collection chamber,
   wherein the cross section of the outlet of the dust collection chamber is larger than the combined cross section of through-holes in the working head.

2. A power tool according to claim 1, wherein the cross-sectional area of the inlet to the dust collection chamber is greater than or equal to the cross-sectional area of the inlet to the duct.

3. A power tool according to claim 1, wherein the cross-sectional area of the outlet from the dust collection chamber is greater than or equal to the cross-sectional area of the inlet thereto.

4. A power tool according to any one of claim 1, wherein the cross-sectional area of the outlet from the dust collection chamber is greater than or equal to the cross-sectional area of the inlet to the duct.

5. A power tool according to claim 1, wherein the inlet of the dust collection chamber is located above a horizontal plane, wherein at least two-thirds of the interior volume of the dust collection chamber is above the plane.

6. A power tool according to claim 1, wherein the exterior of the dust collection chamber is substantially symmetrical about a vertical plane containing the longitudinal axis of the power tool, such that the power tool is usable by at least one of a left and right handed person.

7. A power tool according to claim 1, wherein the dust collection chamber is detachable from the power tool, the outlet of the duct and the inlet to the dust collection chamber have complementary asymmetric profiles, and the dust collection chamber is attachable to the outlet of the duct in only one possible configuration.

8. A power tool according to claim 1, wherein the exterior of the dust collection chamber is asymmetric about a vertical plane containing the longitudinal axis of the power tool, the dust collection chamber being detachable from the power tool, and the dust collection chamber being attachable to the outlet of the duct in at least one of two possible configurations, wherein one of at least two configurations being for use of the power tool by a left-handed person, and wherein one of at least two configurations being for use of the power tool by a right-handed person.

9. A power tool according to claim 1, wherein the duct is contained within a handle of the power tool.

10. A power tool according to claim 1, wherein the dust collection chamber is provided with at least one of the following group consisting of an anti-static coating, an anti-conductive coating, and an earthing wire.

11. A power tool according to claim 1, wherein the dust collection chamber is at least partially transparent.

12. A power tool according to claim 11, wherein the dust collection chamber is at least partially made of polypropylene.

13. A power tool according to claim 11, wherein the dust collection chamber is at least partially made of glass-filled nylon.

14. A power tool according to claim 1, wherein the dust collection chamber comprises at least one of a door and lid.

15. A power tool according to claim 1, wherein the filter is removable from the dust collection chamber.

16. A power tool according to claim 1, wherein the filter is constructed from at least one of the group consisting of a fabric filter, a pleated filter, and a mesh.

17. A power tool according to claim 1, wherein the filter comprises a first filter element for filtering course dust and a second filter element for filtering finer dust than the first filter element.

18. A power tool according to claim 1, wherein the dust collection chamber is substantially in the shape of a cylinder having a longitudinal axis oriented substantially horizontally with respect to the power tool, the inlet to said dust collection chamber is located on a curved surface of said cylinder, and the outlet of said dust collection chamber is located on an end face of said cylinder.

19. A power tool according to claim 18, wherein the filter is located centrally within the dust collection chamber coaxially with said axis of the dust collection chamber.

20. A power tool according to claim 1, wherein the dust collection chamber is substantially in the shape of a drum having an axis of rotational symmetry oriented substantially vertically with respect to the power tool, the inlet to said dust collection chamber is located on a curved surface of said drum, and the outlet of said dust collection chamber is located on the upper face of said drum.

21. A power tool according to claim 20, wherein the filter is located centrally within the dust collection chamber coaxially with said axis of the dust collection chamber.

22. A power tool according to claim 18, wherein the dust collection chamber contains a second smaller cylinder, the second smaller cylinder has the same orientation as and is coaxial with the first said cylinder, the second cylinder is open at one end thereof to the interior of the dust collection chamber and at the other end thereof provides the outlet from the dust collection chamber, and the filter is located across or around said outlet.

23. A power tool according to claim 20, wherein the dust collection chamber contains a second smaller drum, the second smaller drum has the same orientation as and is coaxial with the first said drum, the second drum is open on the lower face thereof to the interior of the dust collection chamber and on the upper face thereof provides the outlet from the dust collection chamber, and the filter is located across or around said outlet.

24. A power tool according to claim 1, wherein the fan is located on a drive shaft of a motor of the power tool, wherein said motor provides power for the working head of the power tool.

25. A power tool according to claim 24, wherein the drive shaft carries a second fan operable to cool said motor, said second fan being contained in a chamber of said power tool which is sealed from fluid communication with said duct.

26. A power tool according to claim 1, wherein the power tool is a sander, the working head is a platten and the working element is a sheet of sandpaper.

27. A power tool according to claim 1, wherein the power tool is an angle grinder. the working head is a spindle and the working element is at least one of a grinding wheel or disc.

28. A dust extraction module for use with a power tool, said dust extraction module comprising:
   a dust collection chamber having an inlet connectable in fluid communication with an outlet of a dust-extracting duct of said power tool, and having an outlet in fluid communication with atmospheric air; and
   a filter locatable in fluid flow between the outlet of said dust collection chamber and said atmospheric air;
   wherein the dust collection chamber has a substantially circular cross section, the inlet to said dust collection chamber is at a perimeter of said dust collection chamber and the outlet of said dust collection chamber is from a center of said dust collection chamber,
   wherein the cross section of the outlet of the dust collection chamber is larger than the combined cross section of through-holes in a working head.

29. A dust extraction module according to claim 28, wherein the cross-sectional area of the outlet from the dust collection chamber is greater than or equal to the cross-sectional area of the inlet thereto.

30. A dust extraction module according to claim 28, wherein the inlet to the dust collection chamber is located above a horizontal plane having at least two-thirds of the interior volume of the dust collection chamber above the plane.

31. A dust extraction module according to claim 28, wherein the inlet to the dust collection chamber has an asymmetric profile or has a profile with rotational symmetry of 180 degrees.

32. A dust extraction module according to claim 28, wherein the dust collection chamber is provided with at least one of an anti-static material, an anti-conductive coating, and an earthing wire.

33. A dust extraction module according to one of claim 28, wherein the dust collection chamber is at least partially transparent.

34. A dust extraction module according to claim 33, wherein the transparent dust collection chamber is made of polypropylene.

35. A dust extraction module according to claim 28, wherein the dust collection chamber is at least partially made of glass-filled nylon.

36. A dust extraction module according to claim 28, wherein the dust collection chamber comprises at least one of a door and a lid.

37. A dust extraction module according to claim 28, wherein the filter is removable from the dust collection chamber.

38. A dust extraction module according to claim 28, wherein the filter is at least one of a fabric filter, a pleated filter and a mesh material.

39. A dust extraction module according to claim 28, wherein the filter comprises a first filter element for filtering course dust and a second filter element for filtering finer dust than the first filter element.

40. A dust extraction module according to claim 28, wherein the dust collection chamber is substantially in the shape of a cylinder having a longitudinal axis, the inlet to said dust collection chamber is located on a curved surface of said cylinder, and the outlet of said dust collection chamber is located on an end face of said cylinder.

41. A dust extraction module according to claim 40, wherein the filter is located centrally within the dust collection chamber coaxially with said axis of the dust collection chamber.

42. A dust extraction module according to claim 28, wherein the dust collection chamber is substantially in the shape of a drum having an axis of rotational symmetry, the inlet to said dust collection chamber is located on a curved surface of said drum, and the outlet of said dust collection chamber is located on a face of said drum.

43. A dust extraction module according to claim 42, wherein the filter is located centrally within the dust collection chamber coaxially with said axis of the dust collection chamber.

44. A dust extraction module according to claim 40, wherein the dust collection chamber contains a second smaller cylinder, the second smaller cylinder has the same orientation as and is coaxial with the first said cylinder, the second cylinder is open at one end thereof to the interior of the dust collection chamber and at the other end thereof provides the outlet from the dust collection chamber, and the filter is located across or around said outlet.

45. A dust extraction module according to claim 42, wherein the dust collection chamber contains a second smaller drum, the second smaller drum has the same orientation as and is coaxial with the first said drum, the second drum is open on one face thereof to the interior of the dust collection chamber and on the other face thereof provides the outlet from the dust collection chamber, and the filter is located across or around said outlet.

* * * * *